United States Patent
Shi et al.

(10) Patent No.: US 10,714,996 B2
(45) Date of Patent: Jul. 14, 2020

(54) EXTERNAL ROTOR ELECTRIC MACHINE WITH SMC BLOCKS INTERPOSED BETWEEN PERMANENT MAGNETS

(71) Applicant: TM4 INC., Boucherville (CA)

(72) Inventors: Ruisheng Shi, Montreal (CA); Arbi Gharakhani, Verdun (CA); Martin Houle, Laval (CA)

(73) Assignee: TM4 INC., Boucherville (CA)

( * ) Notice: Subject to any disclaimer, the term of this patent is extended or adjusted under 35 U.S.C. 154(b) by 290 days.

(21) Appl. No.: 15/558,609

(22) PCT Filed: Mar. 14, 2016

(86) PCT No.: PCT/CA2016/050279
§ 371 (c)(1),
(2) Date: Sep. 15, 2017

(87) PCT Pub. No.: WO2016/145521
PCT Pub. Date: Sep. 22, 2016

(65) Prior Publication Data
US 2018/0083504 A1    Mar. 22, 2018

Related U.S. Application Data

(60) Provisional application No. 62/134,089, filed on Mar. 17, 2015.

(51) Int. Cl.
*H02K 1/27* (2006.01)
*H02K 29/03* (2006.01)
(Continued)

(52) U.S. Cl.
CPC ............. *H02K 1/2786* (2013.01); *H02K 1/02* (2013.01); *H02K 1/246* (2013.01); *H02K 29/03* (2013.01);
(Continued)

(58) Field of Classification Search
CPC ........ H02K 1/2786; H02K 1/02; H02K 1/278; H02K 1/246; H02K 29/03
See application file for complete search history.

(56) References Cited

U.S. PATENT DOCUMENTS

| 5,631,512 A | 5/1997 | Kawabata et al. |
| 6,717,323 B1 | 4/2004 | Soghomonian et al. |

(Continued)

FOREIGN PATENT DOCUMENTS

| DE | 102013202137 A1 | 8/2014 |
| EP | 0226586 A1 | 7/1987 |

(Continued)

OTHER PUBLICATIONS

PCT International Search Report for PCT International Application No. PCT/CA2016/050279; dated May 30, 2016; (4 pages).

(Continued)

*Primary Examiner* — Jue Zhang
*Assistant Examiner* — Bart Iliya
(74) *Attorney, Agent, or Firm* — McCoy Russell LLP

(57) ABSTRACT

External rotor electric machine with SMC blocks interposed between permanent magnets. The machine has an internal stator and an external cylindrical rotor. Permanent magnets and SMC blocks are mounted on the inner surface of the rotor.

13 Claims, 5 Drawing Sheets

(51) Int. Cl.
*H02K 1/24* (2006.01)
*H02K 1/02* (2006.01)
*H02K 21/22* (2006.01)

(52) U.S. Cl.
CPC ......... *H02K 21/22* (2013.01); *H02K 2201/06* (2013.01); *H02K 2213/03* (2013.01)

(56) References Cited

U.S. PATENT DOCUMENTS

| | | | | |
|---|---|---|---|---|
| 2007/0138876 | A1* | 6/2007 | Evans | H02K 1/148 310/10 |
| 2008/0074009 | A1* | 3/2008 | Enomoto | H02K 1/145 310/67 R |
| 2010/0126234 | A1* | 5/2010 | Maekawa | D06F 37/206 68/28 |
| 2011/0025154 | A1* | 2/2011 | Nussbaumer | H02K 1/2786 310/90.5 |
| 2012/0299430 | A1 | 11/2012 | Pennander et al. | |
| 2013/0234540 | A1* | 9/2013 | Tsutsui | H02K 1/02 310/44 |
| 2015/0155748 | A1* | 6/2015 | Nord | H02K 1/145 310/156.02 |
| 2017/0093231 | A1* | 3/2017 | Laing | H02K 21/12 |

FOREIGN PATENT DOCUMENTS

| | | |
|---|---|---|
| GB | 2392315 | 2/2004 |
| WO | 2014174572 A1 | 10/2014 |

OTHER PUBLICATIONS

PCT Written Opinion for PCT International Application No. PCT/CA2016/050279; dated May 30, 2016; (5 pages).

European Patent Office, European Search Report with written opinion issued in application EP16764086.1, dated Sep. 26, 2018, 8 pages, European Patent Office, Hague, Netherlands.

* cited by examiner

EXTERNAL ROTOR ELECTRIC MACHINE WITH SMC BLOCKS INTERPOSED BETWEEN PERMANENT MAGNETS

CROSS REFERENCE TO RELATED APPLICATIONS

This application is a national phase under 35 U.S.C. § 371 of International Application No. PCT/CA2016/050279 filed on Mar. 14, 2016, which claims priority to and benefit of U.S. Provisional Ser. No. 62/134,089 filed on Mar. 17, 2015, and the entirety of these applications are incorporated by reference herein.

FIELD

The present disclosure relates to external rotor electric machines. More specifically, the present disclosure is concerned with an external rotor electric machine requiring less permanent magnets.

BACKGROUND

Electric motors using rear-earth permanent magnets are used in various devices and assemblies, mainly due to their good performances. However, the earth's resources are not infinite and rare-earth permanent magnets are getting very expensive. Accordingly, the reduction of the usage of rear-earth permanent magnets in electric motors is being studied.

DETAILED DESCRIPTION

Figure 1:
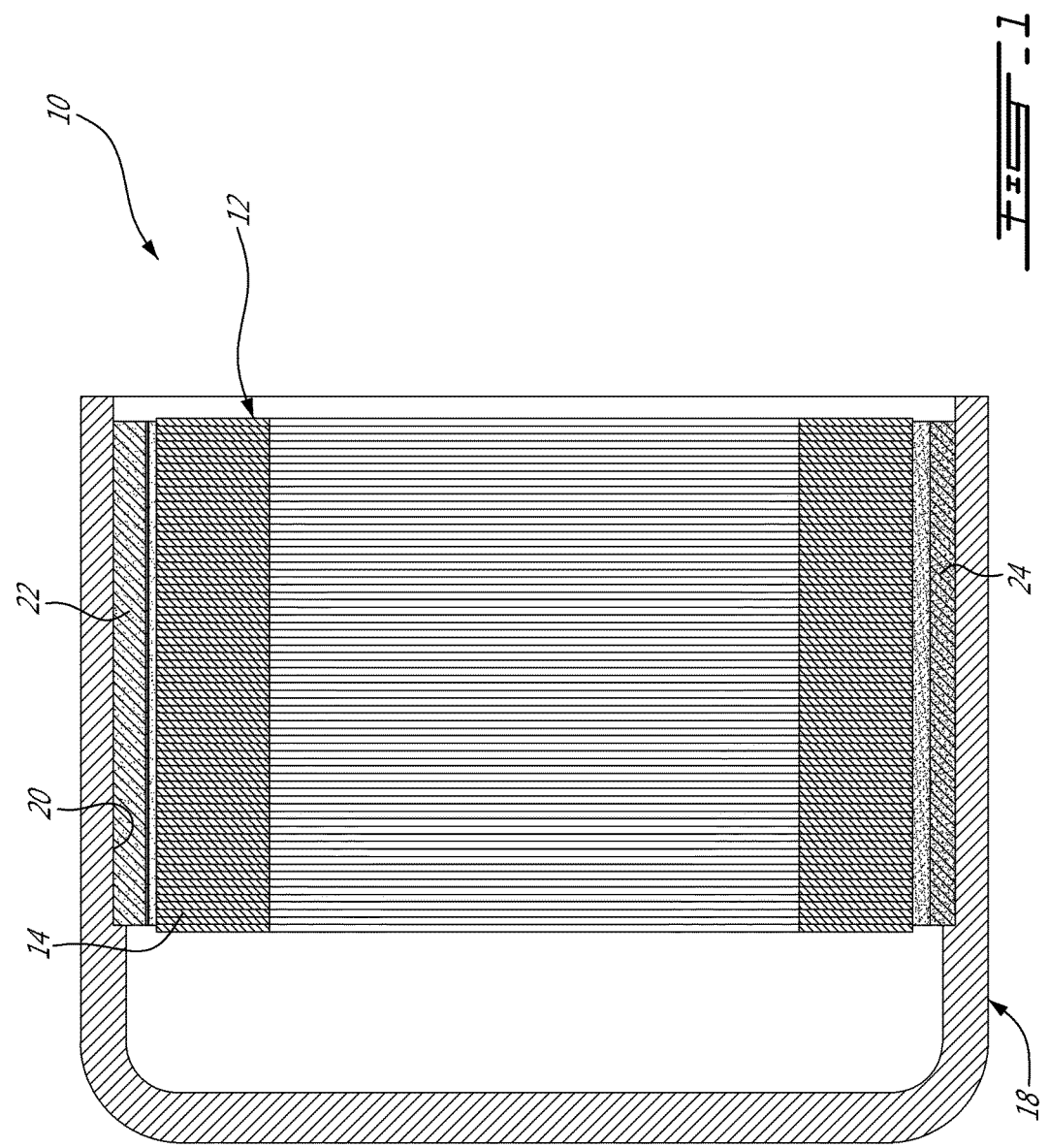
FIG. 1 is a side sectional view of an external rotor electric machine according to an illustrative embodiment.

Generally stated, is it proposed to decrease the quantity of permanent magnets used in an external rotor electric machine by increasing the space between adjacent permanent magnets, or by decreasing the size of the magnets, and by inserting blocks of soft magnetic material (aka ferromagnetic material) such as, for example, SMC (Soft Magnetic Composite) or magnetic powders, therebetween. These blocks will be referred to as "SMC blocks" in the present disclosure and appended claims. This addition of SMC blocks reduces the quadrature axis reluctance since it decreases the air gap thickness in the quadrature axis flux path. Accordingly, this creates a stronger supplemental reluctance torque in the electric machine, which improves performances thereof.

It has been found that by using powder metallurgy, it is possible to produces SMC blocks suitable to be positioned between adjacent permanent magnets and therefore replace some of the permanent magnets in an external rotor electric machine. As non-limiting examples, magnetic powders such as ATOMET 1 and ATOMET 3 manufactured by Rio Tinto have been found suitable to make the SMC blocks.

In accordance with an illustrative embodiment, there is provided an external rotor electric machine comprising an internal stator and an external rotor coaxial with the internal stator. The external rotor including an inner surface facing the internal stator; at least two permanent magnets and at least two SMC blocks. The permanent magnets and the SMC blocks being alternately positioned in a circumferential row on the inner surface of the rotor.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

In the present specification and in the appended claims, various terminology which is directional, geometrical and/or spatial in nature such as "longitudinal", "horizontal", "front", rear", "upwardly", "downwardly", etc. is used. It is to be understood that such terminology is used for ease of description and in a relative sense only and is not to be taken in any way as a limitation upon the scope of the present disclosure.

The expression "connected" should be construed herein and in the appended claims broadly so as to include any cooperative or passive association between mechanical parts or components. For example, such parts may be assembled together by direct connection, or indirectly connected using further parts therebetween. The connection can also be remote, using for example a magnetic field or else.

Other objects, advantages and features of the present external rotor electric machine with reduced quantity of permanent magnets will become more apparent upon reading of the following non-restrictive description of illustrative embodiments thereof, given by way of example only with reference to the accompanying drawings.

An external rotor electric machine 10 is illustrated in a side sectional view in appended FIG. 1. The electric machine 10 includes an internal stator 12 made of stacked laminations 14 and provided with coils 16 (schematically illustrated in FIG. 2) conventionally placed in outwardly facing slots 17. The electric machine 10 also includes an external cylindrical rotor 18 having an inner surface 20 to which are mounted permanent magnets 22, 23 and SMC blocks 24. Permanent magnets 22 have their north pole facing the stator 12 and permanent magnets 23 have their south pole facing the stator 12.

Figure 2:
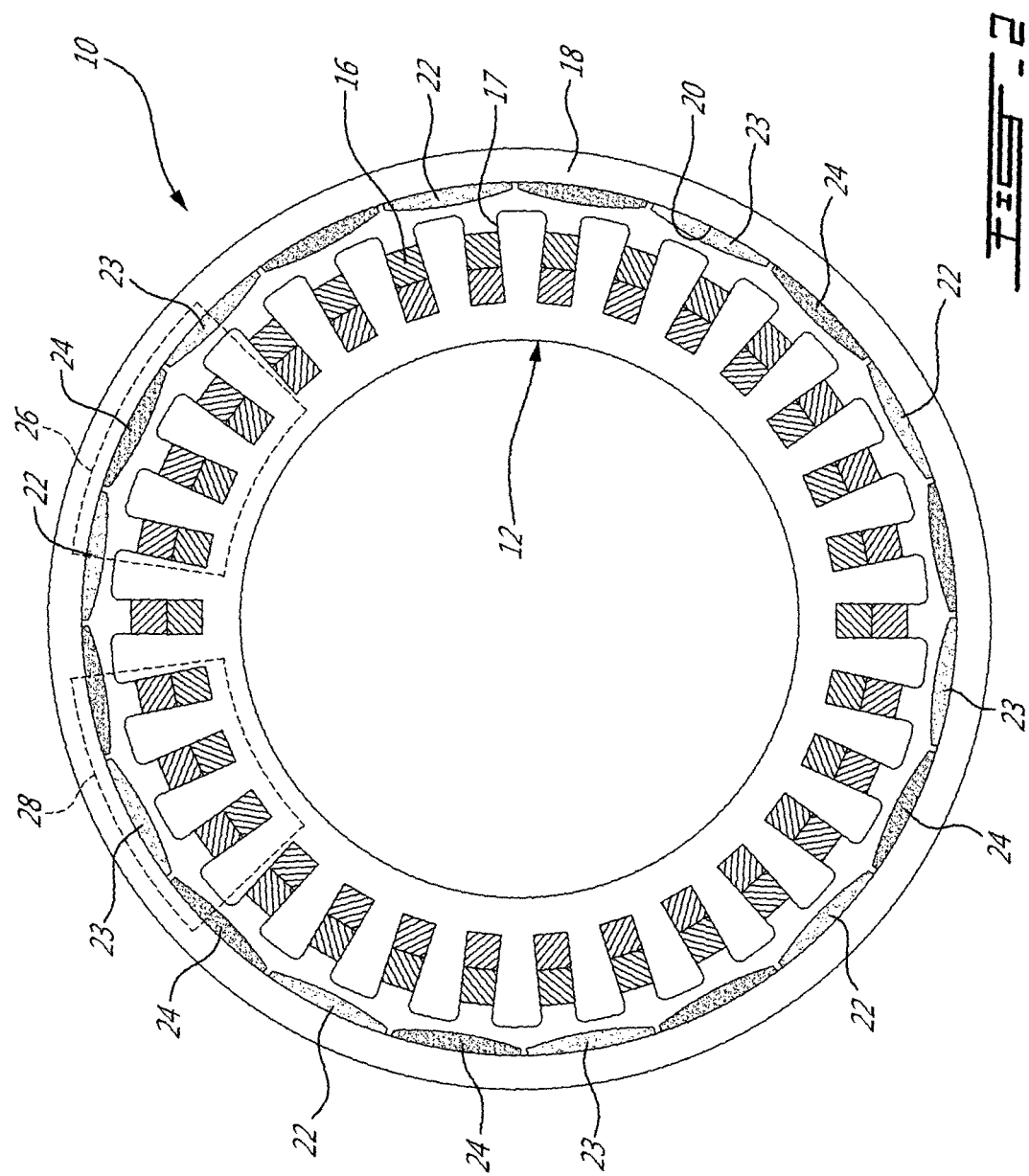
FIG. 2 is a front sectional elevation view of an external rotor electric machine according to a first illustrative embodiment.

As can be better seen from FIG. 2, which is a front elevation view of the electric machine 10, the SMC blocks 24 and the permanent magnets 22, 23 are alternatively mounted to the inner surface 20 of the rotor 18. In other words, the permanent magnets 22, 23 and the SMC blocks 24 are alternately positioned in a circumferential row on the inner surface 20 of the rotor 18.

One skilled in the art will understand that an adhesive (not shown) may be provided between the SMC blocks 24 and the inner surface 20 of the rotor 18 and between the magnets 22, 23 and the inner surface 20. Alternatively, other mechanical elements (not shown) can be used to adequately mount the SMC blocks 24 and the magnets 22, 23 to the rotor 18.

In the electric machine 10, the SMC blocks 24 and the permanent magnets 22, 23 have the same dimensions and shape. Accordingly, the number of permanent magnet material reduction is about 50% compared to an all-magnets similar machine.

FIG. 2 also shows the direct axis flux path 26 and the quadrature axis flux path 28. As can be understood, the air gap thickness of the quadrature axis flux path is decreased by the addition of the SMC blocks 24. The reluctance torque is therefore increased by the addition of the SMC blocks 24. Accordingly, the total torque of the electric machine is increased without an increase in input voltage.

Figure 3:
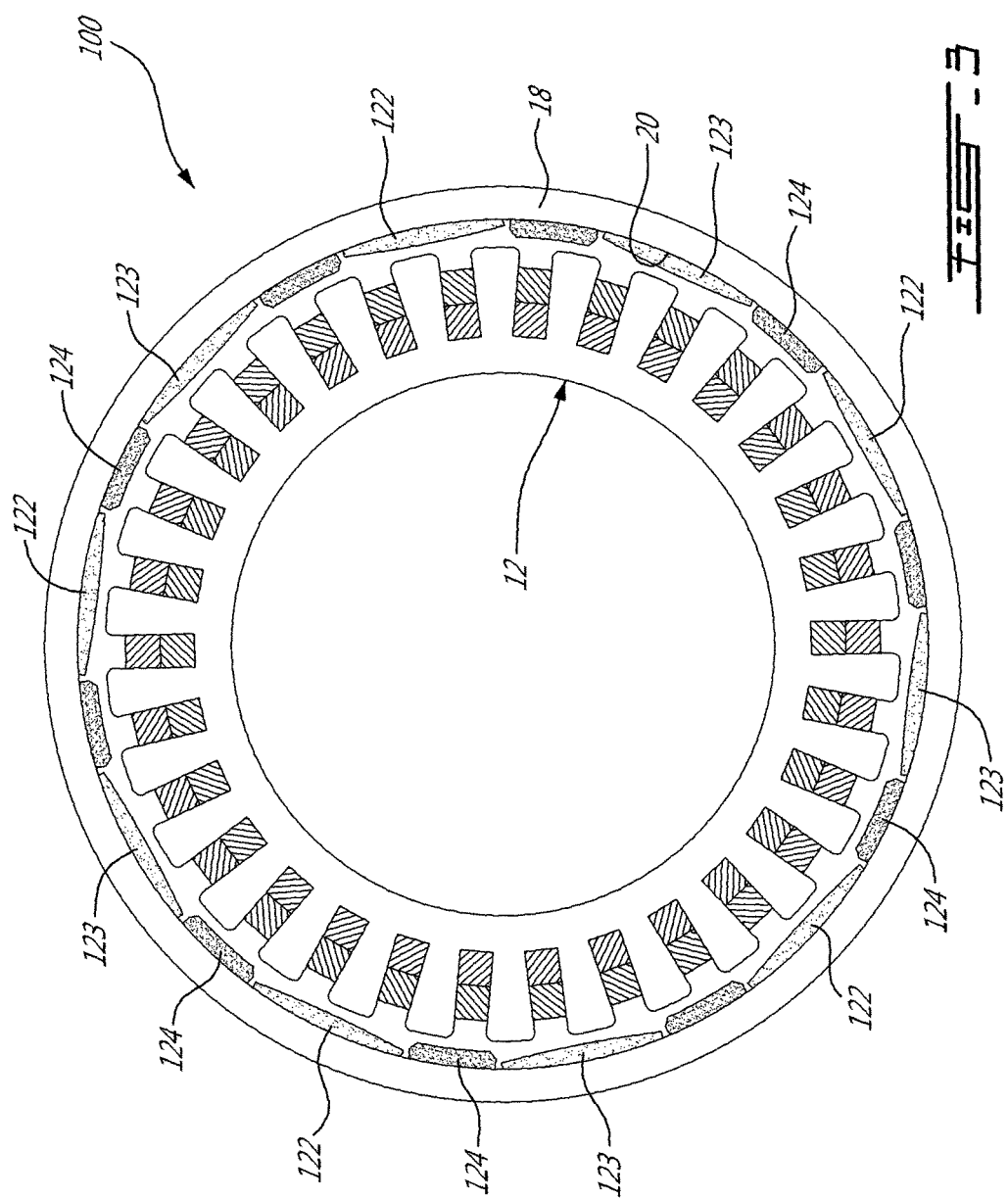
FIG. 3 is a front elevation view of an external rotor electric machine according to a second illustrative embodiment.

Turning now to FIG. 3 of the appended drawings, an external rotor electric machine 100 according to a second illustrative embodiment will be described. It is to be noted that since the electric machine 100 is very similar to the electric machine 10 of FIGS. 1 and 2, only the differences therebetween will be described hereinbelow, for concision purpose.

In the electric machine 100, the permanent magnets 122, 123 are not the same size and shape as the SMC blocks 124.

As will easily be understood by one skilled in the art, the profiled of the magnets creates sinewave-liked flux distribution in the air gap, which reduces the cogging torque, the harmonics in back EMF and the torque ripple. The addition of the SMC blocks 124 reduces the air gap in the quadrature axis and therefore the reluctance. Therefore the shape and size of the SMC blocks 124 in radial direction have no-relationship. However, in the circumferential direction, the size of the SMC blocks 124 should be adequate to allow the placement of the magnets and SMC blocks.

One skilled in the art will understand that the shape and size of the magnets and of the SMC blocks may be optimized to meet the specific application requirement during design process while reducing the quantity of magnet as much as possible.

In this illustrated example, there is a reduction of about 30% of the quantity of permanent material compared to a conventional machine using only permanent magnets.

One skilled in the art will understand that the reduction of the quantity of permanent magnet material used can be changed by changing the size of the permanent magnets and of the SMC blocks.

Figure 4:
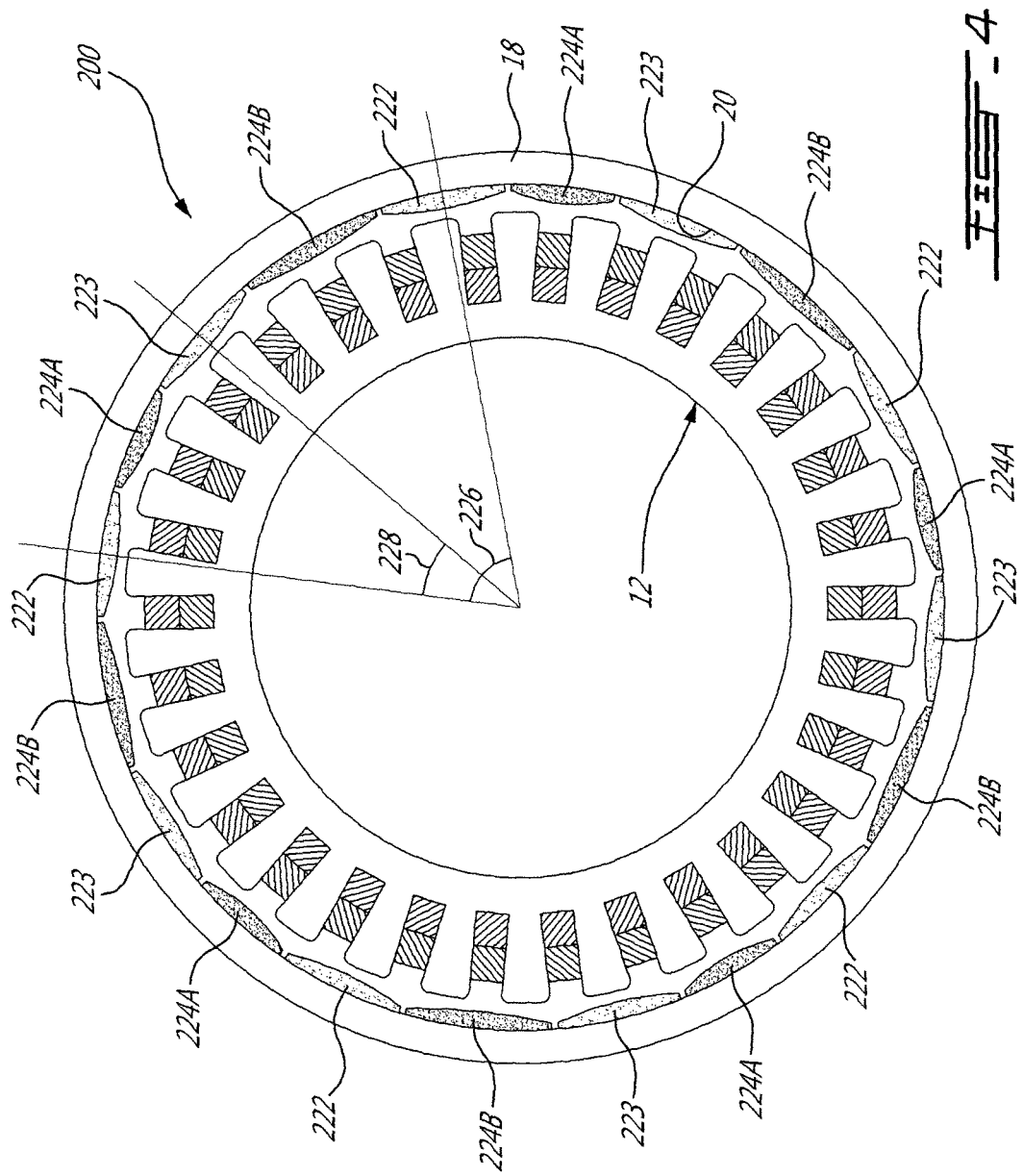
FIG. 4 is a front elevation view of an external rotor electric machine according to a third illustrative embodiment.

Turning now to FIG. 4 of the appended drawings, an external rotor electric machine 200 according to a third illustrative embodiment will be described. It is to be noted that since the electric machine 200 is very similar to the electric machines 10 and 100 described hereinabove, only the differences therebetween will be described hereinbelow, for concision purpose.

In the electric machine 200, the permanent magnets 222, 223 are not equally spaced and as a consequence, two sizes of SMC blocks 224A and 224B are present.

Indeed, to further decrease the cogging torque and the torque ripple in the machine 200, the permanent magnets 222, 223 are not equally spaced on the inner surface 20 of the rotor 18. As can be seen from this figure, the 360 degrees electric angle 226 separating two consecutive magnets 222 having their north pole facing the stator 12 is not conventionally divided in two by the magnet 223 positioned therebetween. The poles are therefore shifted.

The angle shifting of poles depends on the design requirements of the electric machine. Generally stated, 30 electric degree shifting is chosen to reduce the $6^{th}$ torque harmonic while 15 degree is chosen to reduce the $12^{th}$ torque harmonic, and so on.

In the case shown in FIG. 4, a 15-degree pole shifting is applied in this configuration since the cogging and torque ripple reduction are required in the $12^{th}$ harmonic. Indeed, an electric angle 228 is 165 degrees instead of the conventional 180 degrees.

The SMC blocks 224A and 224B are therefore not the same size to keep a substantially equal distance between adjacent SMC blocks and magnets. The SMC blocks 224A being smaller than the SMC blocks 224B. The SMC block 224A may therefore be viewed as a small SMC block and the SMC block 224B may therefore be viewed as a large SMC block.

Figure 5:
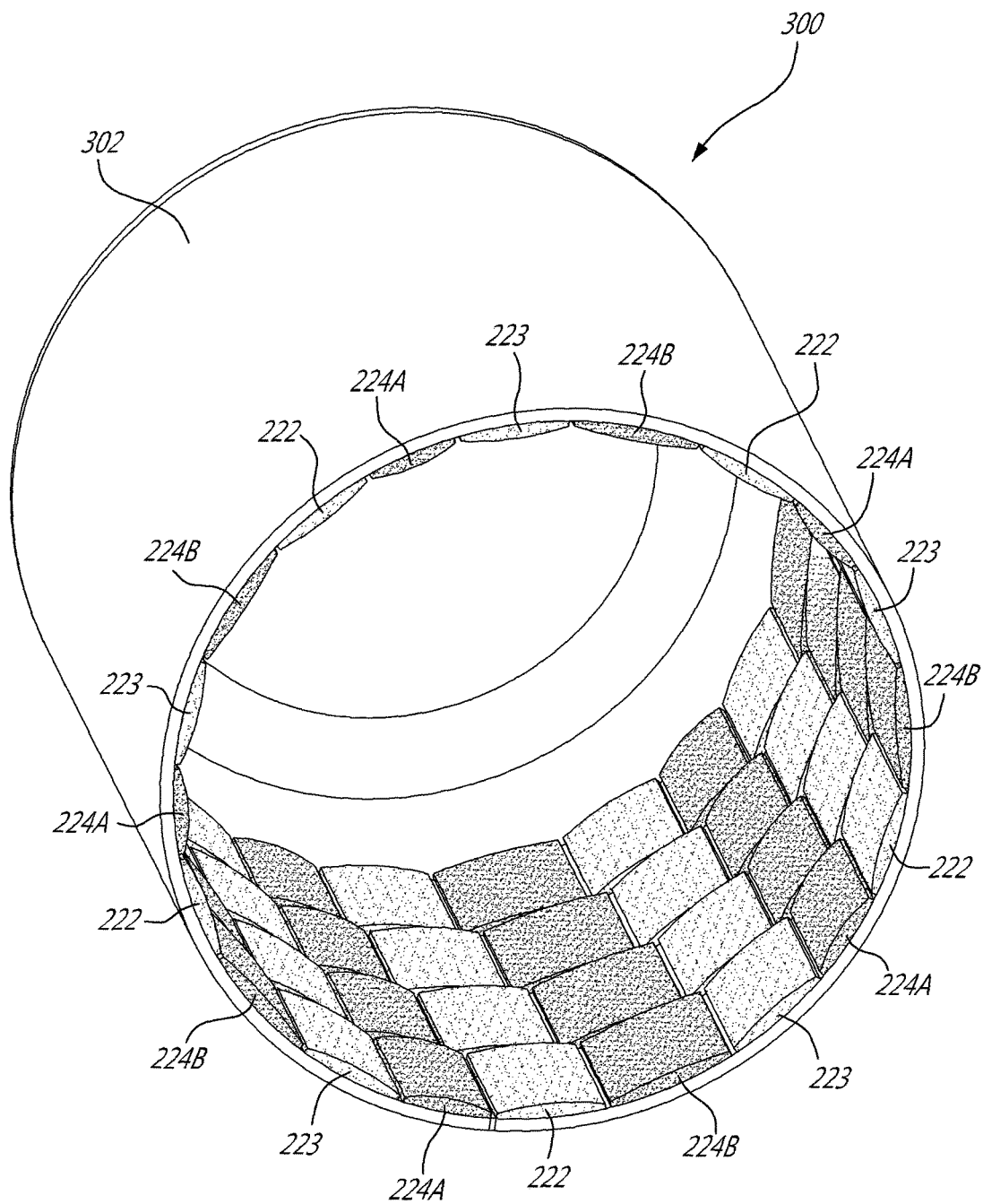
FIG. 5 is a perspective view of the external rotor of an external rotor electric machine according to a fourth illustrative embodiment.

Turning now to FIG. 5 of the appended drawings, an external rotor electric machine 300 according to a fourth illustrative embodiment will be described. It is to be noted that since the electric machine 300 is very similar to the electric machines 10, 100 and 200 described hereinabove, only the differences therebetween will be described hereinbelow, for concision purpose.

As can be seen from this figure, the inner surface of the rotor 302 includes four (4) circumferential rows of magnets 222, 223 and of SMC blocks 224A and 224B. Each row is identical and similar to the third embodiment shown in FIG. 4.

However, each row is angularly shifted with regards to the previous longitudinally adjacent row. While this angular shift is of three (3) degrees according to the fourth embodiment, other angular shift angles can also be foreseen.

This shifting from one row of segments to the next has been found to further reduce cogging torque and torque ripple.

As will be understood by one skilled in the art, the electric machines 10, 100, 200 and 300 illustrated herein and described hereinabove are schematic and lack many required elements for their operation. Indeed, only the elements relating to the comprehension of the external rotor electric machine with reduced quantity of permanent magnets have been shown and discussed.

It is to be understood that the external rotor electric machine with reduced quantity of permanent magnets is not limited in its application to the details of construction and parts illustrated in the accompanying drawings and described hereinabove. The external rotor electric machine with reduced quantity of permanent magnets is capable of other embodiments and of being practiced in various ways. It is also to be understood that the phraseology or terminology used herein is for the purpose of description and not limitation. Hence, although the external rotor electric machine with reduced quantity of permanent magnets has been described hereinabove by way of illustrative embodiments thereof, it can be modified, without departing from the spirit, scope and nature thereof.

What is claimed is:

1. An external rotor electric machine comprising:
   an internal stator; and
   an external rotor coaxial with the internal stator; the external rotor including an inner surface facing the internal stator; the external rotor including at least two permanent magnets and at least two Soft Magnetic Composite (SMC) blocks; the permanent magnets and the SMC blocks being alternately positioned in a circumferential row on the inner surface of the rotor, wherein the at least two SMC blocks are sized differently to position the at least two permanent magnets with a non-equal spacing between adjacent permanent magnets.

2. The external rotor electric machine as recited in claim 1, wherein the at least two permanent magnets and the at least two SMC blocks are of the same shape and size.

3. The external rotor electric machine as recited in claim 1, wherein the shape and size of the at least two permanent magnets is different from the shape and size of the at least two SMC blocks.

4. The external rotor electric machine as recited in claim 1, wherein one half of the at least two permanent magnets is so mounted to the inner surface of the external rotor as to have a north pole facing the internal stator and the other half of the at least two permanent magnets is so mounted to the inner surface of the external rotor as to have a south pole facing the internal stator.

5. The external rotor electric machine as recited in claim 4, wherein circumferential positioning of the permanent magnets and SMC blocks follows a sequence consisting of a permanent magnet having a north pole facing the internal stator, a SMC block, a permanent magnet having a south pole facing the internal stator and a SMC block.

6. The external rotor electric machine as recited in claim 1, wherein one half of the at least two SMC blocks are small SMC blocks and wherein the other half of the at least two SMC blocks are large SMC blocks.

7. The external rotor electric machine as recited in claim 6, wherein one half of the at least two permanent magnets is so mounted to the inner surface of the external rotor as to have a north pole facing the internal stator and the other half of the at least two permanent magnets is so mounted to the inner surface of the external rotor as to have a south pole facing the internal stator.

8. The external rotor electric machine as recited in claim 7, wherein circumferential positioning of the at least two permanent magnets and the at least two SMC blocks follows a sequence consisting of a permanent magnet having a north pole facing the internal stator, a small SMC block, a permanent magnet having a south pole facing the internal stator and a large SMC block.

9. The external rotor electric machine as recited in claim 8, including at least two longitudinally adjacent circumferential rows of the at least two permanent magnets and the at least two SMC blocks; each circumferential row being so positioned onto the inner surface of the external rotor as to be angularly shifted with respect to a longitudinally adjacent circumferential row.

10. The external rotor electric machine as recited in claim 9, including four longitudinally adjacent circumferential rows of the at least two permanent magnets and the at least two SMC blocks.

11. The external rotor electric machine as recited in claim 1, including at least two longitudinally adjacent circumferential rows each including at least two permanent magnets and at least two SMC blocks; each circumferential row being so positioned onto the inner surface of the external rotor as to be angularly shifted with respect to a longitudinally adjacent circumferential row.

12. The external rotor electric machine as recited in claim 11, including four longitudinally adjacent circumferential rows of the at least two permanent magnets and the at least two SMC blocks.

13. The external rotor electric machine as recited in claim 1, wherein the at least two SMC blocks include a first SMC block of a first size and a second SMC block of a second size, the first SMC block adjacent to one side of one of the at least two permanent magnets with a gap in between the first SMC block and a permanent magnet and the second SMC block adjacent to another side of the permanent magnet with another gap between the second SMC block and the permanent magnet.

* * * * *